US011931875B2

(12) United States Patent
Vervier et al.

(10) Patent No.: US 11,931,875 B2
(45) Date of Patent: Mar. 19, 2024

(54) DEVICE HAVING A QUICK COUPLING SYSTEM FOR FASTENING AN EXCHANGEABLE HEAD

(71) Applicant: Dubuis et Cie. SAS, Villebarou (FR)

(72) Inventors: Patrick Vervier, Villebarou (FR); Vincent Cerfeuillet, Villebarou (FR)

(73) Assignee: Dubois et Cie S.A.A, Villebarou (FR)

( * ) Notice: Subject to any disclaimer, the term of this patent is extended or adjusted under 35 U.S.C. 154(b) by 0 days.

(21) Appl. No.: 17/546,832

(22) Filed: Dec. 9, 2021

(65) Prior Publication Data

US 2022/0176538 A1 Jun. 9, 2022

(30) Foreign Application Priority Data

Dec. 9, 2020 (EP) .................................... 20315488

(51) Int. Cl.
*B25F 3/00* (2006.01)
*B25F 5/00* (2006.01)

(52) U.S. Cl.
CPC ................ *B25F 3/00* (2013.01); *B25F 5/005* (2013.01)

(58) Field of Classification Search
CPC .......... B25F 3/00; B25F 5/005; B25B 27/146; B25B 27/10
See application file for complete search history.

(56) References Cited

U.S. PATENT DOCUMENTS 2,674,469 A * 4/1954 Covington .......... F16L 55/1007 251/149.6
3,914,848 A * 10/1975 Bagby .................... B25B 27/10 29/890.144
4,818,157 A * 4/1989 Kouvelis ............... B23B 51/126 81/125
5,118,248 A * 6/1992 Brucher .................... B66F 9/18 403/339
5,666,711 A * 9/1997 Pfeiffer .................. B21D 39/04 29/272

(Continued)

FOREIGN PATENT DOCUMENTS

EP 2626608 A 8/2013
WO 2019108539 A 6/2019

OTHER PUBLICATIONS

European Search Report dated May 19, 2021 cited in corresponding EP Application No. 20315488.5.

*Primary Examiner* — Thomas M Wittenschlaeger
*Assistant Examiner* — Katie L Gerth

(57) ABSTRACT

A power tool operable with an exchangeable tool head, and comprising a tool body, and a hydraulic cylinder with a main piston A quick coupling system is arranged at a free end of the tool body and includes an actuation unit and a locking unit movable by the actuation unit between a released position and a locked position to secure the exchangeable head to the tool body. Thee locking unit comprises a first and a second half-ring radially movable between the released position and the locked position. When in the locked position the locking unit is adapted to secure the exchangeable head to the tool body, such that transmission forces can be exchanged between the exchangeable head and the main piston. When in the released position the locking unit is adapted to release any force applied to the exchangeable head to remove the exchangeable head.

19 Claims, 8 Drawing Sheets

(56) References Cited

U.S. PATENT DOCUMENTS

| | | | | |
|---|---|---|---|---|
| 6,334,494 | B1 * | 1/2002 | Nagato | B25B 21/02 173/93.5 |
| 6,343,824 | B1 * | 2/2002 | Foy | A44B 11/2519 24/579.11 |
| 6,792,789 | B1 * | 9/2004 | Faucher | B21D 39/048 72/416 |
| 7,641,415 | B2 * | 1/2010 | Fox | A01B 71/06 403/322.2 |
| 8,469,406 | B2 * | 6/2013 | Takahashi | F16L 37/34 137/614.05 |
| 9,227,240 | B2 * | 1/2016 | MacAdams | B25F 3/00 |
| 9,328,831 | B2 * | 5/2016 | Racault | F16K 17/04 |
| 9,352,429 | B2 * | 5/2016 | Gottschaldt | B25B 27/10 |
| 9,573,335 | B2 * | 2/2017 | Schweizer | B23B 31/1071 |
| 10,989,343 | B2 * | 4/2021 | Madocks | F16L 37/23 |
| 11,034,002 | B2 * | 6/2021 | Gordon | B25B 23/0028 |
| 11,473,701 | B2 * | 10/2022 | Choi | B21D 39/048 |
| 2008/0069663 | A1 * | 3/2008 | Frenken | B25F 5/005 411/351 |
| 2009/0290931 | A1 * | 11/2009 | Blanchard | A01D 34/82 403/204 |
| 2012/0319399 | A1 * | 12/2012 | Schweizer | B26D 7/2614 285/313 |
| 2014/0076417 | A1 * | 3/2014 | Lin | F16L 37/23 137/315.01 |
| 2014/0239599 | A1 * | 8/2014 | Schweizer | B30B 15/026 279/66 |
| 2014/0260505 | A1 * | 9/2014 | Bowles | B25B 23/0035 72/462 |
| 2014/0360243 | A1 * | 12/2014 | MacAdams | B21D 39/048 72/407 |
| 2022/0118594 | A1 * | 4/2022 | Werner | B23B 31/1071 |
| 2022/0347824 | A1 * | 11/2022 | Lefavour | B25B 27/146 |

* cited by examiner

DEVICE HAVING A QUICK COUPLING SYSTEM FOR FASTENING AN EXCHANGEABLE HEAD

CROSS-REFERENCE TO RELATED APPLICATION

This application claims priority from European Patent Application No. 20315488.5, filed on Dec. 9, 2020, the disclosure of which is incorporated herein by reference.

BACKGROUND OF THE INVENTION

The present invention relates to a device having a quick coupling system for fastening an exchangeable head, to an exchangeable head, to a hydraulic tool and to a method for mounting an exchangeable head on a device.

Hydraulic work tools are employed in numerous applications to provide a user with a desired mechanical advantage. One example is in crimping tools used for making crimping connections, such as crimping terminals onto conductors. Another example is in cutting tools where the tool enables the user to apply a relatively large amount of force or pressure.

There are known portable hydraulic tools that allow compressive forces of approximately 20 to 150 kilonewtons to be achieved. These tools are commonly used for operations to crimp or cut electric cables. These tools generally comprise a body in which are accommodated a fluid reservoir, a hydraulic pump, a cylinder and a piston capable of being moved inside the cylinder under the effect of an injection of pressurised fluid into the interior of the cylinder. These tools also comprise a tool head fixed to the body and adapted to receive for example a die set, one of the dies being operated by the piston. In several tools of this type, the dies are removable, and the head can receive different die sets depending on the operation to be performed.

However, in order to perform different operations like crimping and cutting with one tool, a detachable or exchangeable head is desired. Using the same work tool with different detachable/interchangeable heads, it is possible to change over to different applications where necessary.

A particular problem affecting tools with exchangeable heads is the longitudinal forces being transmitted, in other words, the compressive forces produced by the tools, because the coupling mechanism by which the exchangeable head is attached to the device naturally has to withstand these forces and the corresponding safety requirements are relatively high. The aim, therefore, is to find a coupling mechanism that can be handled quickly and easily and yet offers operational safety, even with high and very high longitudinal forces.

Quick-connect coupling mechanisms for such hydraulic tools are of course known per se.

EP1084798 discloses a hydraulic apparatus with an interchangeable apparatus head and a hand-held pressing apparatus. The apparatus head can be associated with the hand-held pressing apparatus with a screw connection. The apparatus head is pushed over a hydraulic cylinder provided within the hand-held pressing apparatus and screw-connected to it by means of an external thread on the apparatus and a mating internal thread on the apparatus head. Such screw connections do not last.

EP2535128 and EP2750873 disclose a quick-connect coupling for connecting an exchangeable head to a pressing device with several balls radially movably disposed in a ball-holding part on the pressing device. The balls are radially movable between a locking position, in which the head is secured to the device and a release position, in which the head can be removed from the device. EP3005495A1 is directed to a hydraulic system comprising a quick-connect coupling similar to the one described above. The mounting of the balls is burdensome. Besides, such complex mechanism is difficult to service.

In WO2019108539A1, an apparatus comprises a first interlocking structure with a T-shaped slot, a head comprises a second interlocking structure arms forming a T-shaped cross section sized to slide into the T-shaped slot of the first interlocking structure. The coupling system is not quick and not reliable.

Finally, in DE102019001298 a removable head is secured to a tool body through a plurality of levers. Such complex mechanism is difficult to service and mount.

With regard to the prior art described above, a technical problem for the invention is seen in further developing a device having a quick coupling system for fastening an exchangeable head in an advantageous manner, particularly as regards making it simpler to change the head. Indeed, although satisfactory in certain respects, a need remains for a quick coupling system allowing changing heads on a device with greater ease and reliability. Furthermore, it would be desirable to ensure that upon attaching the head to the device, the attachment is robust, and the head is in proper position and engagement with the device.

BRIEF SUMMARY OF THE INVENTION

It is an object of the present invention to provide a device having a quick coupling system for fastening an exchangeable head, an exchangeable head, a hydraulic tool and a method for mounting an exchangeable head on a device, which overcome these drawbacks.

Accordingly, the present invention provides a device having a quick coupling system for fastening an exchangeable head according to claim 1. More particularly, the device comprises: a tool body with a cylinder, wherein a main piston is capable of being moved inside the cylinder under the effect of an injection of pressurised fluid into the interior of the cylinder, the tool body extending longitudinally along a tool axis; the quick coupling system arranged at a free end of the tool body with an actuation unit and a locking unit adapted to secure an exchangeable head to the tool body, wherein the locking unit is actuated by the actuation unit between a locking position and a release position, wherein in the locking position the locking unit is adapted to secure the exchangeable head to the tool body, such that transmission forces can be exchanged between the exchangeable head and the piston, and wherein in the released position the locking unit is adapted to release any force applied to the exchangeable head in order to remove the exchangeable head, and wherein the locking unit comprises a first and a second half ring, wherein the half rings are radially movable between the locking position and the released position.

By using a first and second half rings for locking an exchangeable head to the device, a robust and reliable connection is realized. The attachment allows the transmission of high forces between the device and the head, but also a reliable coupling system, easy to use and to manufacture, with low maintenance needs.

In an embodiment, each of the half rings comprises a first and a second end portion, each end portion comprise a groove, wherein the actuation unit comprises two actuation parts, each of the actuation parts having a first and a second actuation segments, and wherein the second actuation segment partly extend within the grooves. The grooves can be easily manufactured, and the mechanical transmission requires little or no maintenance.

In an embodiment, the second actuation segment of the first actuation part partly extends in the groove of the first end portion of the first and second half rings, wherein the second actuation segment of the second actuation part partly extends in the groove of the second end portions of the first and second half rings. In other words, the second actuation segments extend between the half rings and are arranged opposite to each other, such that a symmetry is realized. Thus, the effort applied to the rings are symmetrical, which reduce any premature wear.

In an embodiment, each of the half rings has a curved shape with a front surface, a rear surface, two end portions and two lateral portions extending between and sensibly perpendicular to the front and rear surfaces, wherein the rear surface is sensibly flat, wherein the front surface comprises a first area extending sensibly parallel to the rear surface and a second area having a surface forming an angle with regard to the rear surface, a shoulder being arranged between the first and second areas, such that the thickness of the half ring between the rear surface and the first area is greater than the thickness between the rear surface and the second area. The shape of the half rings increases the locking forces applied on the exchangeable head.

In an embodiment, the quick coupling system further comprises a sleeve slidingly arranged around the quick coupling system, the sleeve being movable along the tool axis, and the actuation unit is connected to the sleeve and adapted to be radially moved by the sleeve from a rest position to an active position, wherein in the rest position the half rings are in the locking position, and in the active position, the half rings are forced in the released position. The sleeve is easy to actuate by a user and the risks of misuse are reduced.

In an embodiment, the sleeve comprises an internal surface facing the tool body and an external surface opposite the internal surface, wherein the internal surface comprises a slope which cooperates with the actuation unit, such that during a translation of the sleeve, the portion of the actuation unit cooperating with the sleeve slides along the slope, resulting in the actuation unit moving radially toward the tool axis between the rest position and the active position. The slope allows to displace the actuation unit in a continuous way.

In an embodiment, the slope is a sloped groove and a second part of the actuation unit is provided with a guiding pin which is arranged inside the sloped groove. The guiding pin is retained in the groove. More particularly, a first part of the actuation unit is provided with a guiding pin. A second part of the actuation unit is provided with a guiding pin. The first guiding pin extends in a first sloped groove. The second guiding pin extends in a second sloped groove.

In an embodiment, the main piston is axially displaceable along a cylinder axis between a rest position and an actuation position under the effect of an injection of pressurised fluid into the interior of the cylinder, wherein the main piston comprises a first end forming a piston surface, and a second end, opposite the first end, wherein the second end comprises a recess, in which an elastic element and a mushroom piston are arranged. The mushroom piston forms a secure system such that the user is certain that the exchangeable head is correctly engaged within the device. Indeed, through the mushroom piston, when engaging the head, there is a need of a minimal engagement force to be applied to the head by the user in order to correctly secure the head to the device.

In an embodiment, the device further comprises a pressure relief valve connected to the cylinder. This is to allow the automatic and rapid return of the fluid contained in the cylinder to the reservoir at the end of operation.

The present disclosure is also directed to an exchangeable head comprising a functional part adapted to apply a force on an element, and an interface part for coupling with a device having a quick coupling system as described above. The interface part comprises circular groove adapted to receive the locking unit, a chamfer for facilitating the insertion of the head within the device, and a recess for partly receiving the main piston. The chamfer is adapted to push the half rings of the device into the released position. The circular groove is adapted to receive the half rings when said rings are in the locking position.

In an embodiment, the circular groove is formed by a bottom, a first and a second lateral wall, wherein the second lateral wall is inclined with regard to the first lateral wall. This is to improve the engagement with the half rings. More particularly, the shape of the groove is adapted to the shape of the half rings.

In an embodiment, the head further comprises a head piston actuated by the main piston. The head piston actuates the functional part and forward the forces applied by the main piston to the functional part.

The present disclosure is further directed to a hydraulic tool comprising a device as already described and a head, wherein the quick coupling system is removably connectable to the circular groove of the exchangeable head, such that in the locking position of the locking unit, the exchangeable head is secured to the device with the half rings extending inside the circular groove, and in the released position, the exchangeable head can be removed from the device.

Finally, the present disclosure relates to a method for mounting an exchangeable head to a device comprising the following steps: providing a device as described above, wherein the locking unit is in the locking position, providing an exchangeable head with a circular groove, a chamfer and a recess, inserting the exchangeable head within the device by pushing the exchangeable head along an insertion axis, such that a portion of the main piston enters the recess provided on the interface part and the chamfer contacts the locking unit, further moving the insertion head along the insertion axis toward the device such that the chamfer moves the locking unit from the locking position toward the release position, further moving the insertion head along the insertion axis toward the device such that the locking unit faces the circular groove and the locking unit automatically return in the locking position, wherein the connection between the head and the device requires a pushing force of at least 8 daN (80 Newtons), and in particular of at least 10 to 12 daN (100 to 120 Newtons).

BRIEF DESCRIPTION OF THE SEVERAL VIEWS OF THE DRAWINGS

Other features and advantages will become more apparent from the description that follows, which is purely illustrative, and not limiting and should be read with reference to the accompanying drawings, in which.

DETAILED DESCRIPTION OF THE PREFERRED EMBODIMENTS

On the different figures, the same reference signs designate identical or similar elements.

Figure 1:
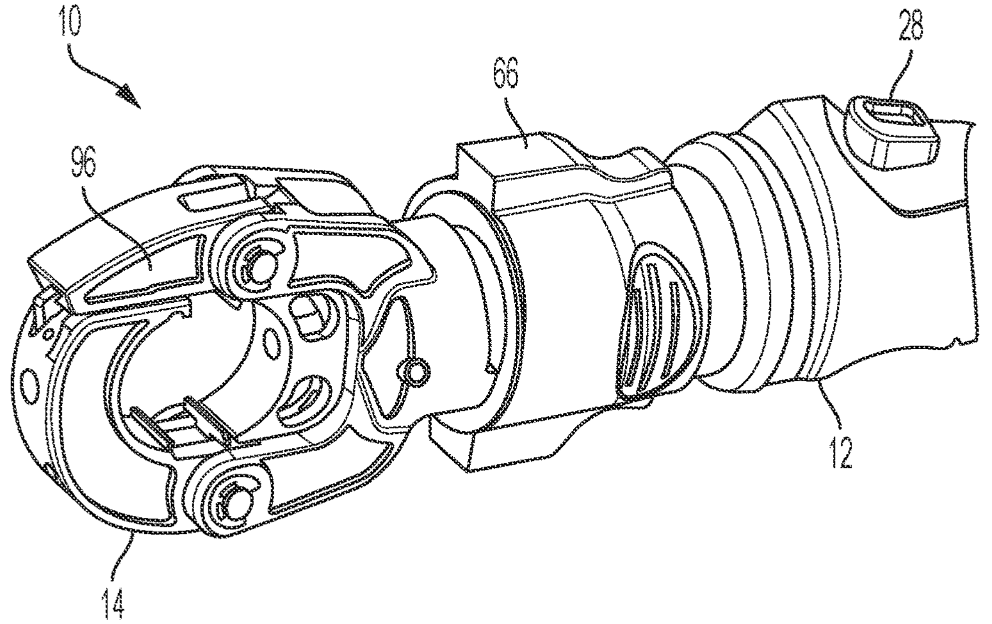
FIG. 1 shows a perspective view of a hydraulic tool with a device having a quick coupling system and an exchangeable head.

FIG. 1 shows a hydraulic tool 10 comprising a device 12 and an exchangeable head 14. The device 12 comprises a quick coupling system 16 for fastening the exchangeable head 14 and a tool body 18 with a cylinder 20. A main piston 22 is capable of being moved inside the cylinder 20 under the effect of an injection of pressurised fluid into the interior of the cylinder 20. The tool body 18 extends longitudinally along a tool axis X.

The device 12 is commonly provided with a fluid reservoir 24 having a cavity 26 intended to contain fluid. The fluid is typically oil. The hydraulic tool 10 is notably a handheld hydraulic apparatus. An electric motor is for instance disposed in the device 12 or connected to the device 12. Drive of the tool 10 is actuated by means of a battery integrated into the device 12. When a finger operated switch 28 is actuated, fluid is pumped out of the reservoir 24 into the cylinder 20, thereby moving the main piston 22.

Figure 2:
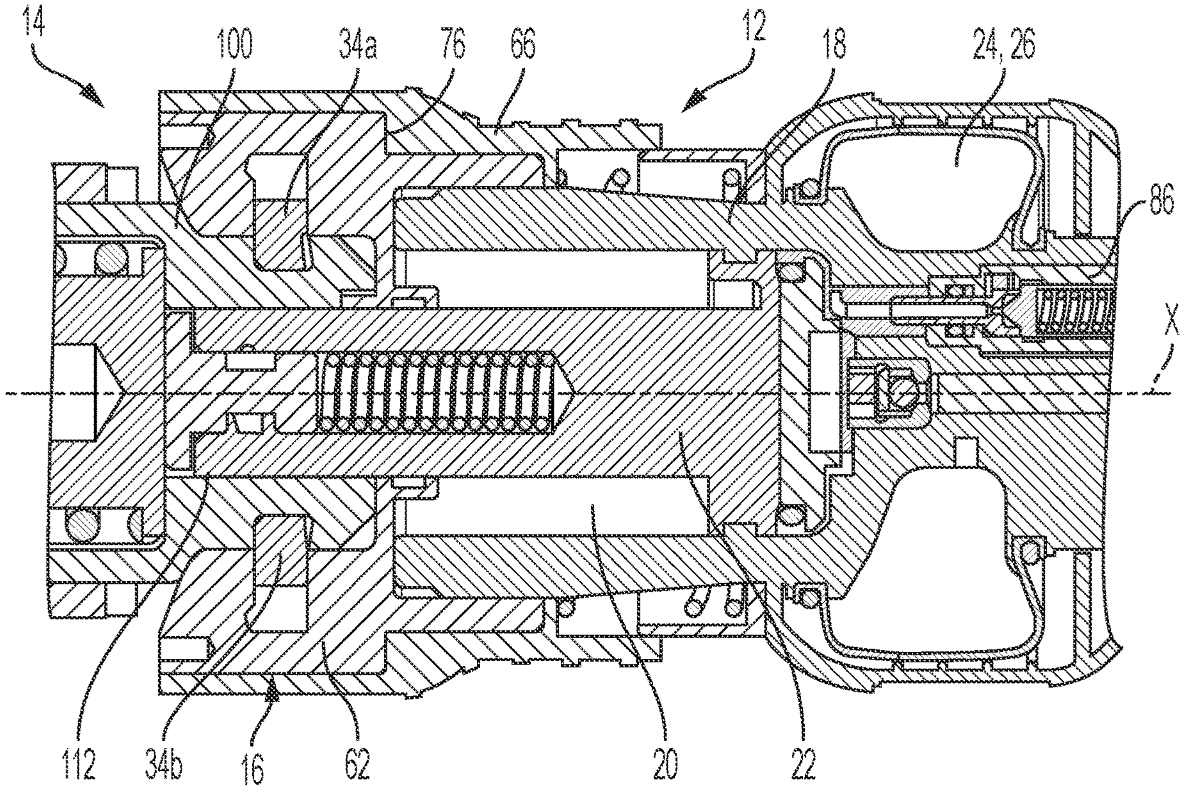
FIG. 2 is a cross-sectional view of the quick coupling system with a sleeve, the quick coupling system being engaged with an exchangeable head.

The quick coupling system 18 is arranged at a free end of the tool body 18, as depicted in FIG. 2. The quick coupling system 18 comprises an actuation unit 30 and a locking unit 32.

The locking unit 32 comprises two half rings 34*a*, 34*b*. The first half ring 34*a* is identical to the second half ring 34*b*. First and second half rings 34*a*, 34*b* are arranged facing each other such that they define an opening.

Figure 6A:
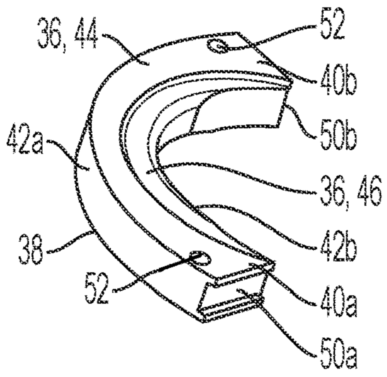
FIG. 6A shows a perspective view of a half ring of the locking unit of FIGS. 4A and 5A.

As shown in FIG. 6A, each of the half rings 34*a*, 34*b* has a curved shape. Each of the half rings 34*a*, 34*b* comprises a front surface 36, a rear surface 38, two end portions 40*a*, 40*b* and two lateral portions 42*a*, 42*b*. The two lateral portions 42*a*, 42*b* extend between the front and rear surfaces 36, 38. The two end portions 40*a*, 40*b* extend between the front and rear surfaces 36, 38.

Figure 6B:
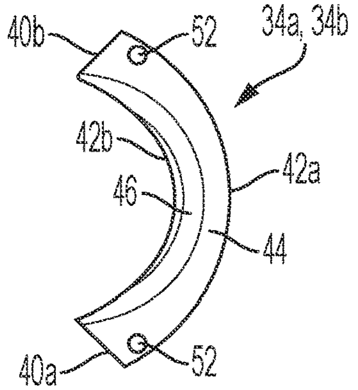
FIG. 6B shows a front view of the half ring of FIG. 6A.
Figure 7:
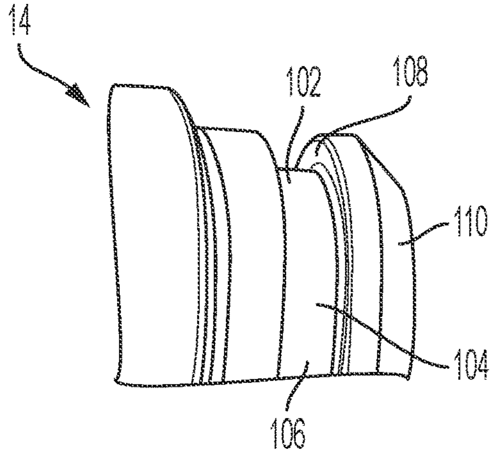
FIG. 7 shows a detail of the exchangeable head with a chamfer and a circular groove.

The rear surface 38 is sensibly flat. In other words, the rear surface 38 extends sensibly within a plan. The front surface 36, opposite the rear surface 38 comprises two area 44, 46. The first area 44 is sensibly flat and extends parallel to the rear surface 38. The second area 46 is inclined with regard to the first area 44. A shoulder 48 is provided between the first and the second area 44, 46, such that the thickness between the rear surface 38 and the first area 44 is greater than the thickness between the rear surface 38 and the second area 46. Besides, the thickness of the half ring between the second area and the rear surface 38 decreases when going from the second lateral portion 42*b* to the shoulder 48. The second area 46 is in the shape of a crescent, as better illustrated in FIG. 6B. The second area 46 is larger in the middle of the half ring than at the end portions 40*a*, 40*b*. More particularly, the second area 46 is machined in the half ring and defines a conical portion. When assembled, the rear surface 38 is oriented toward the exchangeable head, and the front surface is oriented toward the tool body.

Figure 13:
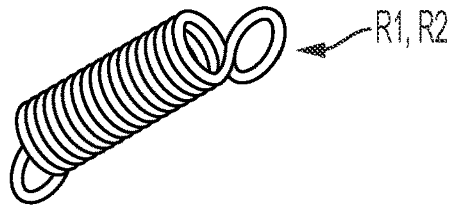
FIG. 13 shows an elastic element cooperating with the half rings of the locking unit to force said half rings in the locking position and/or to enable an automatic return of the sleeve.

The first end portion 40*a* comprises a groove 50*a*. The second end portion 40*b* comprises a groove 50*b*. A first and second through hole 52 are provided between the rear surface and the first area at the vicinity of the end portions for receiving a first and a second attachment pin 54. The pins 54 enable to connect springs R1, R2 (see FIG. 4B and FIG. 13) to the half rings 34*a*, 34*b*. The springs R1, R2 are pretensioned springs and they enable an automatic return of the half rings in a locking position. The springs R1, R2 are for instance springs as depicted in FIG. 13.

The half rings 34*a*, 34*b* are for instance made of metal.

As previously mentioned, the half rings 34*a*, 34*b* are arranged within the quick coupling system 16 facing each other. More particularly, the lateral portions 42*a*, 42*b* are facing each other. For instance, the concave side of the lateral portions 42*a*, 42*b* are facing each other. The lateral surfaces define each two cylindrical surfaces having different main planes. The first end portions 40*a* are arranged facing each other. The second end portions 40*b* are arranged facing each other. The rear surfaces 38 extend for instance in the same plan.

Figure 4A:
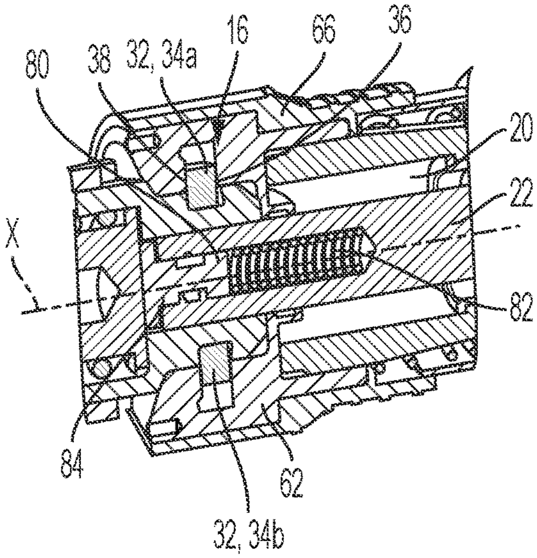
FIG. 4A, FIG. 4B and FIG. 4C show different cross-sectional views of the quick coupling system of FIG. 2 with a locking unit comprising two half rings in a locking position.
Figure 4B:
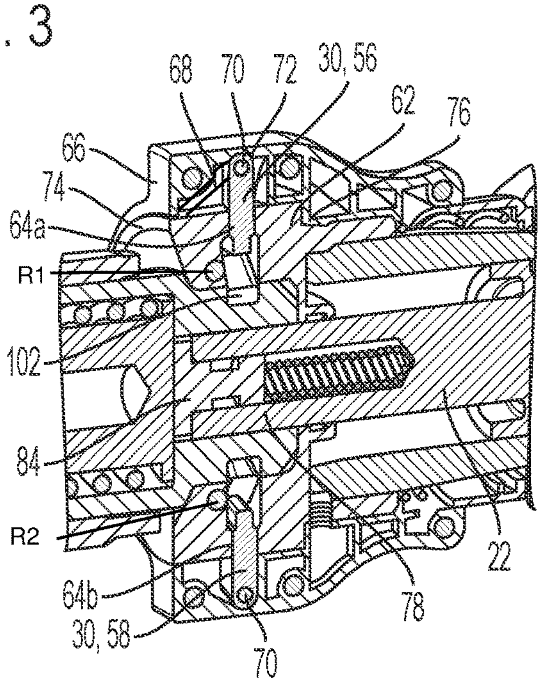
Figure 4C:
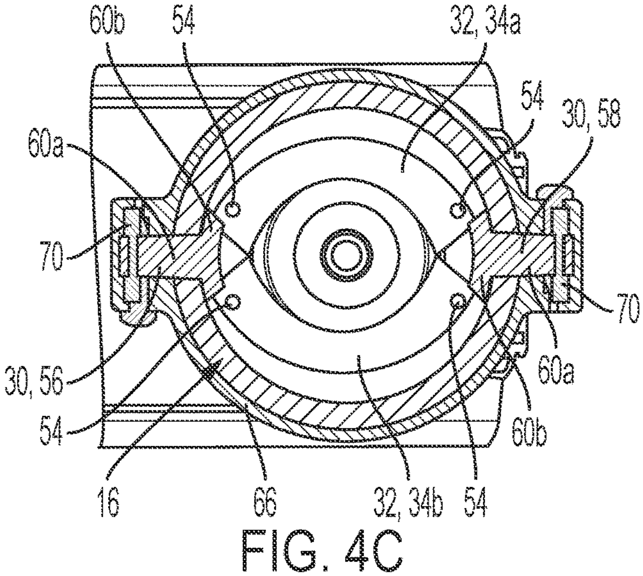
Figure 5A:
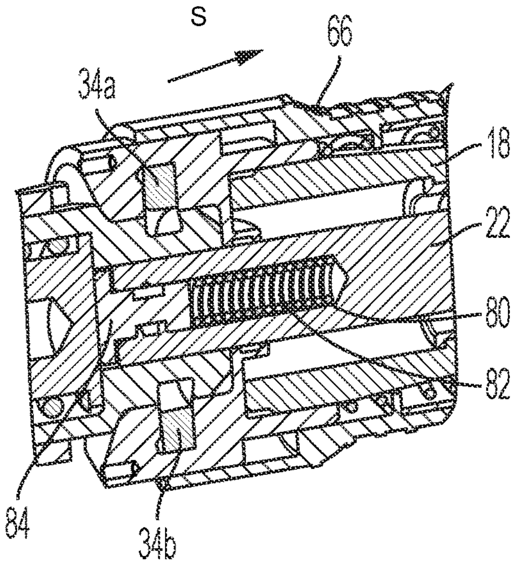
FIG. 5A, FIG. 5B, FIG. 5C show different cross-sectional views of the quick coupling system of FIG. 2 with a locking unit comprising two half rings in a released position.
Figure 5B:
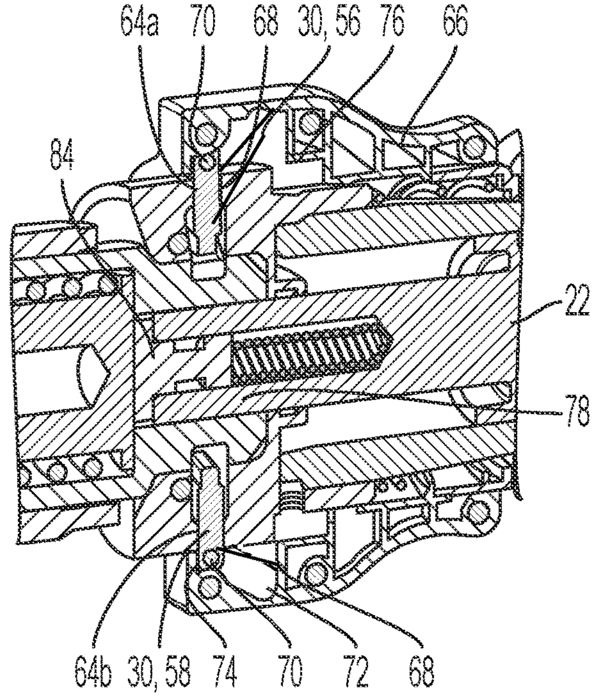
Figure 5C:
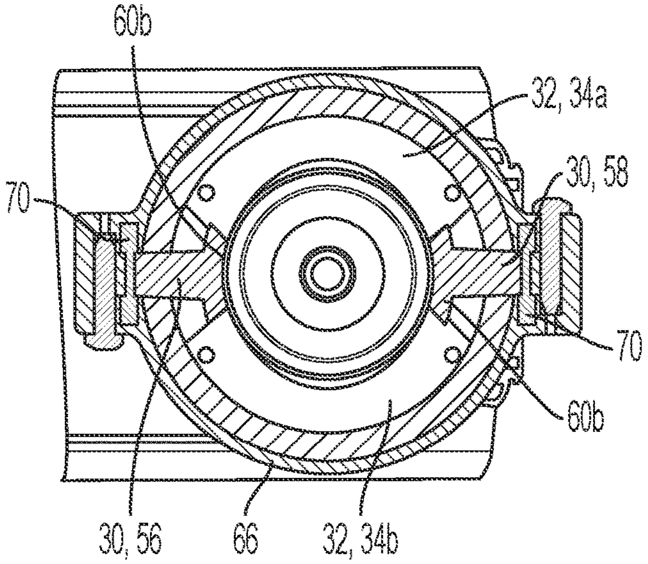

The actuation unit 30 partly extends between two end portions 40*a*, 40*b* of the half rings 34*a*, 34*b*, as notably seen in FIG. 4C and FIG. 5C. More particularly, the actuation unit 30 comprises a first actuation part 56 and a second actuation part 58. The first and second actuation parts 56, 58 are identical. The first and second actuation parts 56, 58 are each one-piece elements. The first and second actuation parts 56, 58 each comprises a first actuation segment 60*a* and a second actuation segment 60*b*. The first actuation segment 60*a* longitudinally extends in a direction radial to the tool axis X. The second actuation segment 60*b* extends at a free end of the first actuation segment 60*a*, on both side of the first actuation segment 60*a* (see FIG. 5C, FIG. 4C). The second actuation segment 60*b* comprises two free ends, the free ends each engaging with the groove 50*a*, 50*b*. The second actuation segment 60*b* has a curved shape, and its end surfaces (at its free ends) have an inclination which corresponds to the inclination of the end portions 40*a*, 40*b* of the half rings 34*a*, 34*b*. More particularly, the second actuation segment 60*b* extends between the first end portions

40*a* or the second end portions 40*b* of the half rings 34*a*, 34*b*. The second actuation segment 60*b* is slidingly engaged in the grooves 50*a*, 50*b*. The actuation parts 56, 58 thus control the position of the locking unit 32. The half rings 34*a*, 34*b* will remain in the locking position or will be forced in the released position depending on the position of the second actuation segments 60*b* within the grooves 50*a*, 50*b*.

The quick coupling system comprises a housing 62. The housing 62 is fixedly connected to a free end of the tool body 18, and the locking and actuation units 30, 32 are movingly arranged within the housing 62. More particularly, the housing 62 may have a cylindrical shape defining an opening and two lateral recesses 64*a*, 64*b* adapted to receive the first actuation segments 60*a*. The recesses 64*a*, 64*b* are for instance arranged opposite each other, as better seen in FIGS. 4C and 5C. The actuation unit 30 and the locking unit 32 are movable with regard to the housing 62. An internal groove may be provided on the housing 62 to receive the half rings 34*a*, 34*b*, notably in the released position.

The quick coupling system is symmetrical with a mirror symmetry with regard to a plan orthogonal to the tool axis.

The first actuation segments 60*a* interact with a sliding sleeve 66. The sleeve 66 is arranged around the housing 62. The sleeve 66 is movable along the tool axis X. The sleeve 66 comprises an internal surface facing the quick coupling system and an external surface, opposite the internal surface. The internal surface is provided with a slope 68. More particularly the internal surface comprises a sloped groove 68. For instance, two sloped grooves 68 are provided. The two sloped grooves are arranged opposite each other. The first sloped groove is arranged facing the first actuation part. The second sloped groove is arranged facing the second actuation part. The sleeve 66 controls the position of the actuation unit 30. For instance, the sleeve 66 is connected to the first actuation segments 60*a*, as better seen in FIG. 4B and FIG. 5B. Each first actuation segment 60*a* comprises a guiding pin 70 attached at its free end (opposite the second actuation segment). A first guiding pin 70 is provided on the first actuation part, and a second guiding pin 70 is provided on the second actuation part. The guiding pin 70 is arranged in the sloped groove 68 provided on the sleeve 66. The sleeve 66 is movable along the tool axis X, wherein the actuation unit 30 and the locking unit 32 are movable in the radial direction. The first actuation segments 60*a* interact with the sleeve 66 such that during a translation of the sleeve 66, the guiding pins 70 slide along the slopes 68, resulting in the actuation parts 56, 58 moving radially toward the axis tool X between a rest position and an active position. In the rest position, the guiding pin 70 is positioned in the sloped groove 68 at a first end 72. In the active position, the guiding pin is positioned in the sloped groove at the second end 74. An abutment 76 may be designed between the housing 62 and the sleeve 66. An elastic element may be provided between the sleeve 66 and the housing 62, such that the sleeve 66 is forced in a position, in which the guiding pin 70 remains at the first end 72. In order to move the actuation unit 30 from the rest position to the active position, a user has to slide the sleeve 66 against the force of the elastic element. Thus, an automatic return of the sleeve is realized. In other words, the rest position is a stable position, wherein the active position is an unstable position. In another embodiment, the sleeve may be forced in the rest position without elastic element provided between the sleeve and the housing. For instance, springs R1, R2 force the half rings in the locking position which forces the actuation unit and the sleeve 66 in the rest position. The automatic return of the sleeve is realized through this springs R1, R2. However, in another embodiment, both rest and active positions may be stable positions.

The main piston 22, and more particularly its piston pin 78 is arranged concentrically to the quick coupling system 16 and along the tool axis X. The piston pin 78 is axially movable along the tool axis X and comprises a recess 80 arranged at the free end of the piston pin 78. A spring 82 is arranged in the recess 80 and a mushroom piston 84 interferes with the spring 82. The mushroom piston 84 partly protrudes from the piston pin 78, notably when the spring 82 is in a rest position. The mushroom piston 84 is movable along the tool axis X.

Figure 3:
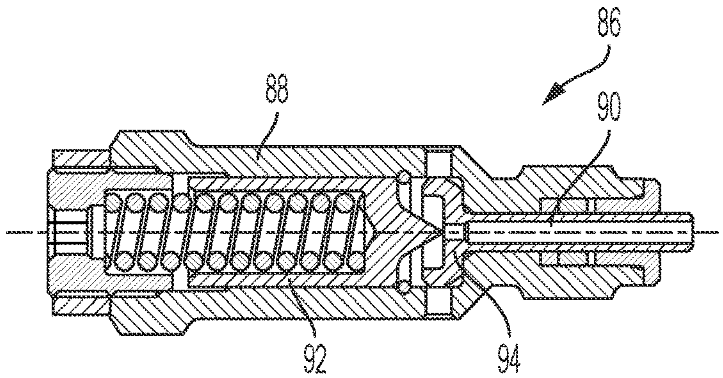
FIG. 3 is a cross-sectional view of a cartridge including a pressure relief valve, intended to be incorporated into the hydraulic tool of FIG. 1.

The device 12 further comprises a pressure relief valve 86 connected to the cylinder 20. The pressure relief valve 86 is detailed notably on FIG. 3. The pressure relief valve 86 is used to perform a fluid return function.

More particularly, the pressure relief valve 86 comprises a valve body 88, a fluid circulation channel 90, a needle 92 and a seat 94. The needle 92 is movable relative to the valve body 88 between a closed position in which the needle 92 is in contact with the seat 94 in order to close the channel and an open position in which the needle is at a distance from the seat in order to allow fluid to circulate in the channel 90. The seat 94 is movable relative to the valve body so that, as soon as fluid circulates in the channel because of the movement of the needle to the open position, the fluid causes a movement of the seat 94 relative to the valve body 88 that tends to move the seat away from the needle and prevents the seat from returning towards the needle, in order to maintain the circulation of fluid in the channel. By virtue of the movable seat 94, the pressure relief valve remains open as long as fluid is circulating in the channel, which allows complete evacuation of the fluid contained in the cylinder of the main piston. Thus, the fluid returns automatically and rapidly to the reservoir as soon as the pressure in the cylinder has reached a predetermined pressure threshold. The pressure relief valve and how said pressure relief valve cooperates with the main piston 22 is more particularly detailed in EP2626608A1 which is herein incorporated by reference.

The quick coupling system 16 is provided for engaging and securing the exchangeable head 14 to the device 12.

The exchangeable head 14 comprises a functional part 96. For example, the exchangeable head 14 is a crimping head and the functional part 96 includes dies. In another embodiment the exchangeable head 14 is a cutting head and the functional part 96 includes blades or jaws. More generally, the functional part 96 is adapted to be actuated by the main piston in order to apply a force on an element (a cable, for example).

Opposite the functional part 96, the exchangeable head 14 comprises an interface part 98 for its coupling to the device 12. The interface part 98 is adapted to be inserted inside the housing 62. The interface part 98 may comprise a shoulder 100 adapted to abut the housing 62.

The interface part 98 is designed to engage with the quick coupling system 16. More particularly, the interface part 98 comprises a circular groove 102 adapted to receive the locking unit 32. The circular groove 102 receives the first and the second half rings 34*a*, 34*b* when said half rings are in the locking position. The circular groove 102 is formed by a bottom 104, a first and a second lateral wall 106, 108. In a cross-section, the first wall 106 extends sensibly orthogonal from the bottom 104, wherein the second wall 108 is inclined with regard to the first wall 106. The inclination of the second wall corresponds to the inclination of the second area 46 of the half rings 34*a*, 34*b*.

The interface part 98 further comprises on its free end adapted to be directed toward the device a chamfer 110. The chamfer 110 allows an easy insertion of the interface part 98 within the housing 62, but most importantly it allows to radially push the locking unit 32 from its locking position toward its released position.

An interface recess 112 is provided at the end of the interface part 98. The recess 112 is adapted to receive the mushroom piston 84 and a portion of the piston pin 78. Thus, the motion of the main piston 22 may be transferred to the functional part 96 of the head in order to impress a force to an element. For instance, the head comprises a head piston 114 which interacts directly with the piston pin.

Figure 11C:
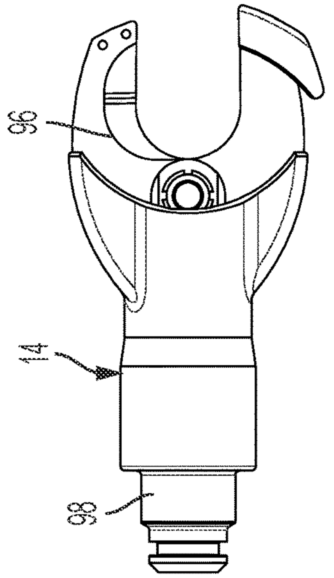
FIGS. 11A to 11E show different embodiment of an exchangeable head.
Figure 11B:
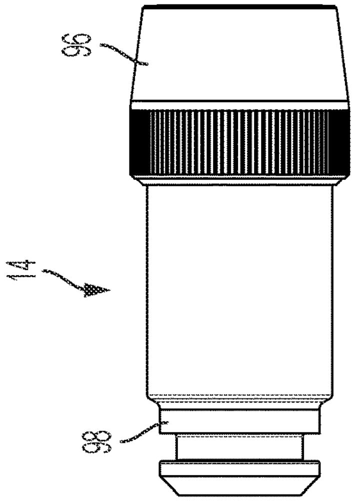
Figure 11A:
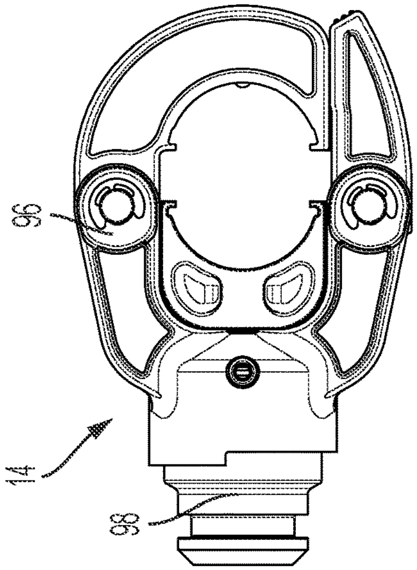
Figure 11E:
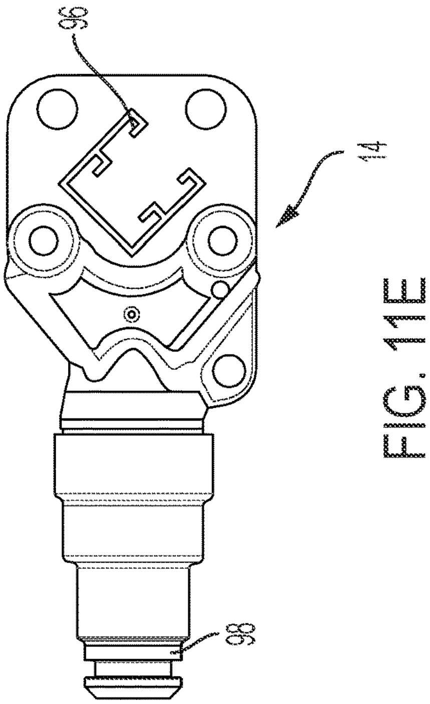
Figure 11D:
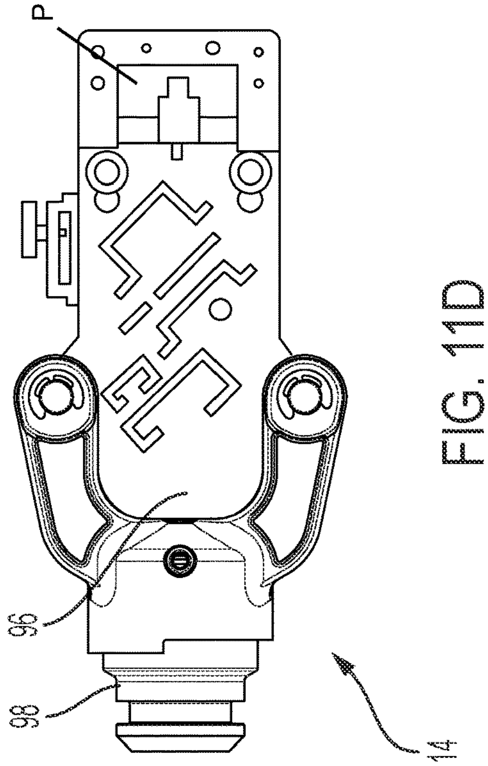

FIG. 11A to FIG. 11E are exemplary exchangeable heads 14 which could be used with the device 12. More particularly, FIG. 11A shows a crimping head adapted to be engaged to the device. In FIG. 11B, the exchangeable head is a knockout head adapted to punch holes in metal sheets. FIG. 11C shows a scissor head. FIG. 11D depicts a din rail cutter head (or strut channel cutter head). FIG. 11E shows a strut rail cutter head. The exchangeable heads in FIG. 11D and FIG. 11E work according to similar principles. In other embodiments (not shown), the exchangeable head may be a crimping head, a dieless crimping head or a conventional cutter head.

Figure 12A:
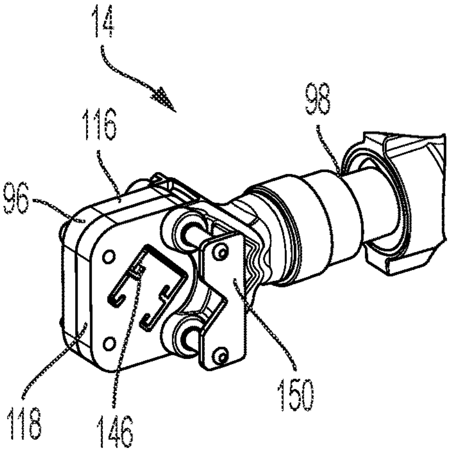
FIG. 12A is a perspective view of the exchangeable head of FIG. 11E.

FIG. 12A is a perspective view of the head of FIG. 11E. More particularly, FIG. 12A shows a shearing exchangeable head 14, notably adapted for shearing (or cutting) strut channels or rails. The exchangeable head 14 comprises a functional part 96 with a first die 116 and a second die 118. The first die 116 is movable with regard to the second die 118. The second die 118 is fix with regard to a frame 120 of the head. The first die 116 is movable with regard to the frame 120. The exchangeable head 14 further comprises a force multiplier unit 122, as better illustrated in FIG. 12B. The force multiplier unit 122 comprises a head cylinder 124. The head cylinder 124 comprises a first section 126 with a first diameter D1. A first head piston 128 is arranged within the first section 126. The head cylinder 124 comprises a second section 130 with a second diameter D2. The second diameter D2 is greater than the first diameter D1. A second head piston 132 is arranged within the second section 130. The first head piston 128 extends between the second head piston 132 and the main piston 22 (and mushroom piston) when the head 14 is connected to the device 12. A shoulder 134 is provided between the first section 126 and the second section 130.

The first head piston 128 comprises a first head piston surface 136 which is facing the mushroom piston and the main piston 22 when the exchangeable head 14 is secured to the device 12. The first head piston 128 is actuated directly by the main piston. The first head piston 128 comprises a first piston rod 138 extending toward the second head piston 132. The second head piston 132 comprises a second head piston surface 140 and a second piston rod 142. The second head piston surface 140 is arranged facing the first section 126. In the rest position, the second head piston surface 140 may abut against the shoulder 134. The second head piston surface 140 is provided with a second head recess 144 in which the first piston rod 138 can be guided.

The first head piston surface is adapted to slide within the first section (notably through the action of the main piston, as explained in more detail below). The first section comprises fluid, notably oil. The first head piston surface is adapted to move toward the second head piston, thus compressing the fluid provided in the first section. The compressed fluid applies a force on a second head piston surface. For instance, the first piston rod 138 does not forward any translation motion to the second head piston 132. The translation motion of the second head piston 132 is realized through the force applied by the fluid provided and compressed in the head cylinder 124.

The second piston rod 142 directly interacts with the first die 116 and thus moves the first die 116. The ratio between the first and second diameters allows to increase the compression force generated by the second head piston 132. The stroke of the first head piston is the twice the stroke of the second head piston.

The first die 116 and the second die 118 each defines a profile (or opening) sized and shaped to receive a strut channel inserted therein. The profile or opening extends through the dies 116, 118. In another embodiment, as seen notably in FIG. 11D, the dies may define several profiles (or openings) sized and shaped to receive strut channels having different dimensions.

Figure 12B:
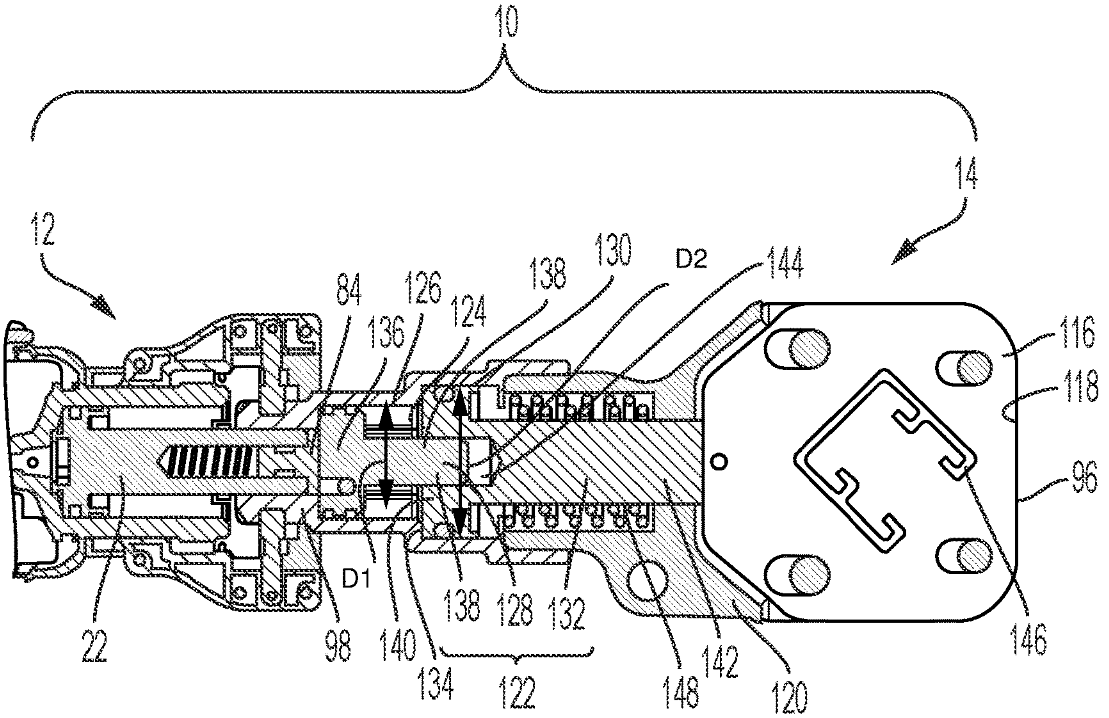
FIG. 12B is a cross-sectional view of the exchangeable head of FIG. 12A with two head pistons.

Referring to FIG. 12A or FIG. 12B, the first die 116 is shown with openings 146, the second die 116 is shown with openings 146. The size and shape of the openings in the pair of dies are the same or substantially the same. In a rest position, the first and second dies 116, 118 are next to each other, the openings of the first die facing the opening of the second die. A strut channel (not represented) can then be inserted through the openings. In order to shear the strut channel, the first die 116 is moved by the first head piston and second head piston, wherein the second die 118 remains fix. Therefore, a shearing force is applied to the strut channel. The shearing force enables cutting the strut channel without any metal filings.

A spring 148 may be provided between the frame 120 and the second head piston in order to move the second head piston automatically back to its rest position when no forces are applied on the first and second head pistons. In the rest position, the dies are back in a first position where the openings of the first die face the openings of the second die.

As seen in FIG. 12A, a support arm bracket 150 is provided. The arm bracket may comprise a recess adapted to receive the strut channel (or rail). The arm bracket may be removably connected to the frame of the exchangeable head. The support arm bracket 150 prevents a rotation of the strut channel during the shearing, in order to provide a clear cut.

The exchangeable head of FIG. 11D is similar to the exchangeable head of FIG. 11 E, as already mentioned. More particularly, the dies in FIG. 11D are different than the dies in FIG. 11E in than they are provided with more openings shaped to different rail or strut channels sizes. The exchangeable head of FIG. 11D is for example adapted to cut four (4) different DIN rails, a threaded rod (for instance a M6 threaded rod), two different bus bars and the punching of rails or strut channels with its hole punching area P. A rail length adjustment can be provided on the exchangeable head for successive cuts.

Figure 8A:
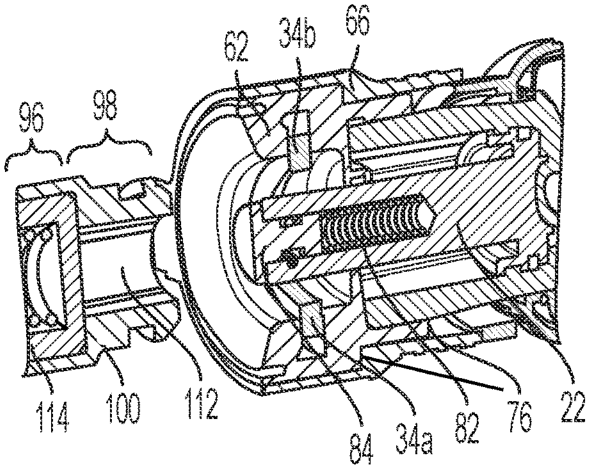
FIGS. 8A to FIG. 8E show different stages for the engagement of the exchangeable head to the device.
Figure 8B:
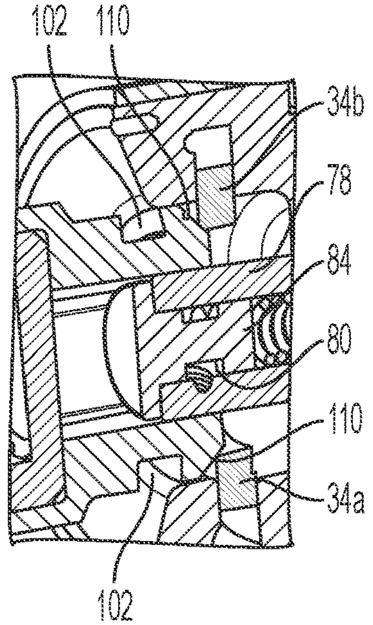

In order to form a hydraulic tool 10 adapted to perform an operation on an element, a user shall first select the exchangeable head 14 corresponding to the action to be performed and to the dimensions of the element. Once the exchangeable head 14 has been selected, exchangeable head 14 and device 12 are aligned such that the interface part 98 of the exchangeable head 14 faces the quick coupling system 16 and a longitudinal axis of the exchangeable head 14 is aligned with the tool axis X, as notably seen in FIG. 8A. Exchangeable head 14 and device 12 are moved toward each other such that the chamfer 110 enters an opening defined by the housing and contacts the half rings 34*a*, 34*b*, as depicted in FIG. 8B. More particularly, the chamfer first contacts the rear surface of the half rings 34*a*, 34*b*.

Figure 8C:
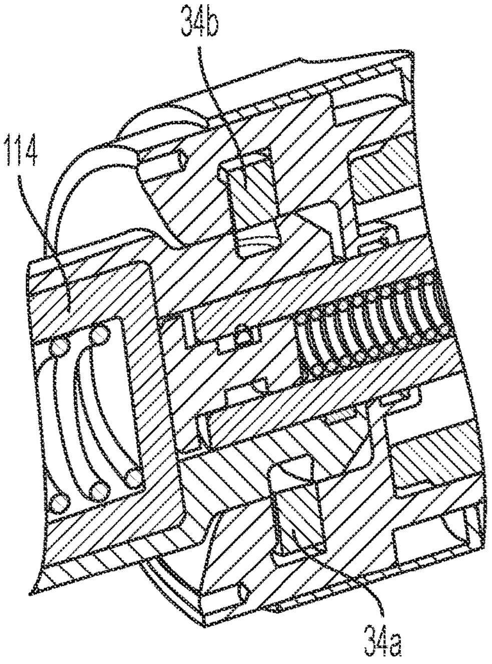

As seen in FIG. 8C, the exchangeable head 14 further moves toward the device 12 and the chamfer 110 pushes the half rings 34*a*, 34*b* from their locking position toward a released position. The half rings 34*a*, 34*b* then slide on a segment of the interface part 96 arranged between the chamfer 110 and the circular groove 102 until the half rings 34*a*, 34*b* are arranged facing the circular groove 102 (see FIG. 8D). When the half rings 34*a*, 34*b* are arranged exactly facing the circular groove 102, no further effort apply on the half rings and they are automatically forced back in the locking position and within the circular groove 102. The half rings thus extend in the circular groove.

Figure 8D:
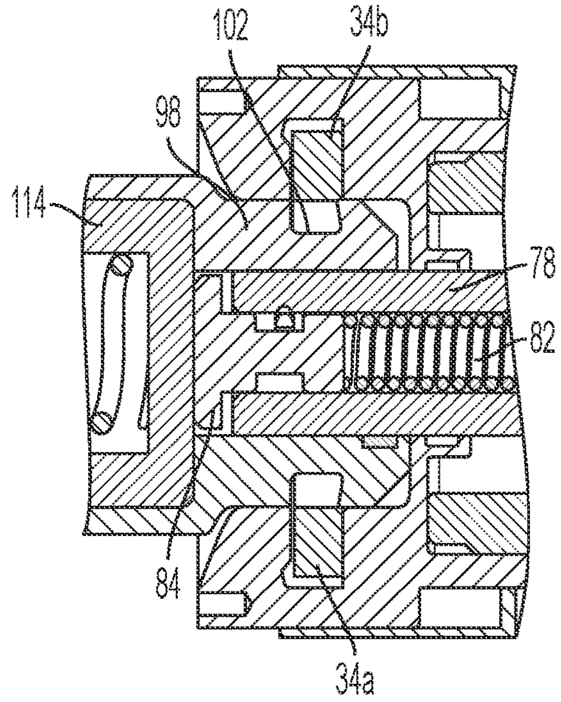
Figure 8E:
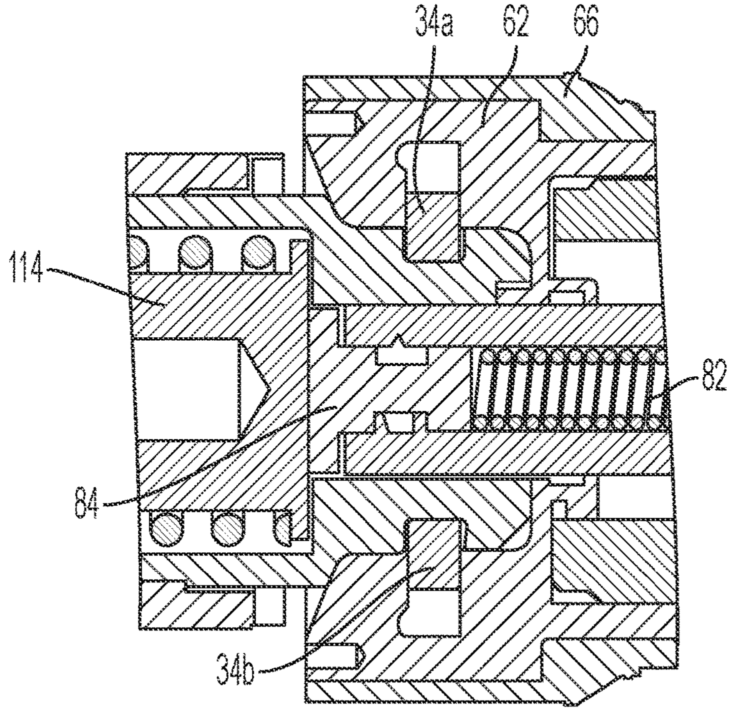

In order to ensure the correct engagement of the exchangeable head and the device, a pushing force of at least 8 daN, and in particular of at least 10 to 12 daN is required. More particularly, as seen in FIGS. 8D and 8E, during the insertion of the exchangeable head 14, the surface of the head piston (or another surface of the head) first contacts the surface of the mushroom piston 84 and the mushroom piston 84 is further pressed by the exchangeable head 14 until it abuts against the main piston pin 78. Once the mushroom piston 84 abuts against the main piston pin 74, the exchangeable head 14 can be further moved inside the device 12 such that the half rings 34*a*, 34*b* engage the circular groove 102. The mushroom piston 84 thus ensures a secure engagement. The mushroom piston 84 ensures also a tolerance compensation. Besides, the mushroom piston enables the disengagement of the exchangeable head.

Figure 9A:
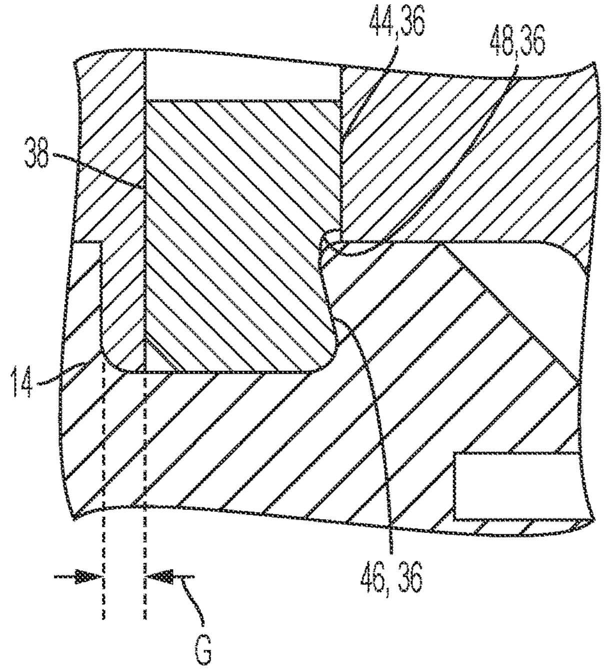
FIG. 9A and FIG. 9B show the half ring of FIG. 6A being arranged and locked into the circular ring of the exchangeable head of FIG. 7.
Figure 9B:
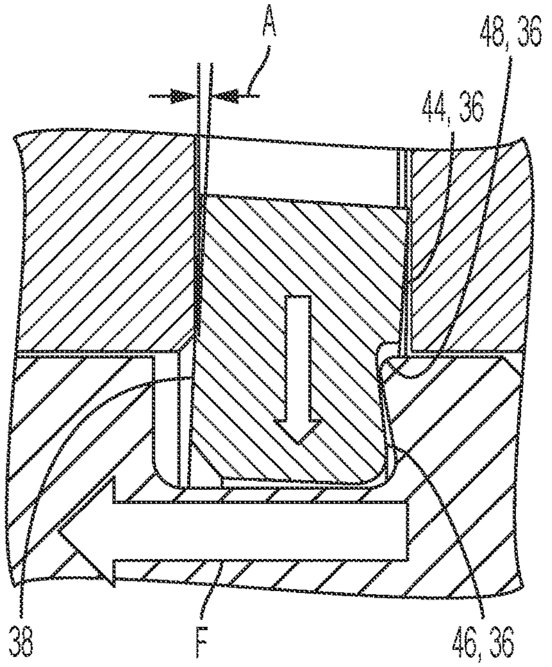

FIG. 9A and FIG. 9B show more precisely the engagement of the half rings 34*a*, 34*b* within the circular groove 102. As seen in FIG. 9A, the second area 46 of the half rings 34*a*, 34*b* cooperates with the inclined wall 108 of the circular groove 102. A functional gap G is provided. More particularly, the circular groove 102 is larger than the thickness of the half rings 34*a*, 34*b*. Thus, when inserted inside the circular groove, the functional gap G arises. When a force F (see FIG. 9B) along the tool axis and in a direction opposite the device is applied to the exchangeable head 14, the inclined wall 108 of the circular groove pushes the half rings 34*a*, 34*b* such that an angle A is created between the rear surface 38 of the half rings 34*a*, 34*b* and the wall of the recess provided in the housing 62. This hook shape with inclined surfaces allows to avoid the exchangeable head (and notably the circular groove) to be damaged when secured to the device. Besides, this particular shape allows to squeeze the half rings and thus increase the locking forces of the half ring within the circular groove. Indeed, with flat surfaces, the half ring could inadvertently escape from the circular groove. The inclined surfaces and the shoulder overcome this issue.

For disengaging the exchangeable head 14 from the device 12, a user can slide the sleeve 66 in a direction opposite the exchangeable head 14, as notably depicted in FIG. 4A, FIG. 4B and FIG. 5A, FIG. 5B.

In FIG. 4A and FIG. 4B, the locking unit 32 is in the locking position and the actuation unit 30 in the rest position. The sleeve 66 abuts against a shoulder of the housing 62. The guiding pin 70 is arranged in the sloped groove 68 of the sleeve, and more particularly at an endpoint 72 of the sloped groove such that the actuation parts 56, 58 extend at a distance from the tool axis X which is greater than in their active position. As seen in FIG. 4C, the second actuation segments 60*b* of the actuation parts 56, 58 are partly engaged in the groove 50*a*, 50*b* provided on the half rings 34*a*, 34*b*, but no constraint is applied to the half rings. For instance, as depicted in FIG. 4C, the inside corners of the half rings 34*a*, 34*b* contact each other.

In order to move the half rings 34*a*, 34*b* from the locking position to the released position, the user slide the sleeve 66 according to arrow S (see FIG. 5A), thus the guiding pin 70 slides inside the sloped groove 68 and by sliding, the distance between the guiding pin 70 and the tool axis X decreases. Thus, the distance between the actuation parts 56, 58 and the tool axis X also decreases, as better seen in FIG. 5B. The linear motion of the sleeve 66 along the tool axis X causes the translation of the actuation parts 56, 58 in the radial direction toward the tool axis X. During the translation of the actuation parts 56, 58 in the radial direction toward the tool axis, the half rings 34*a*, 34*b* are pushed apart from each other. Indeed, the second actuation segments 60*b* slide within the grooves 50*a*, 50*b* of the half rings causing the half rings 34*a*, 34*b* to move apart in the radial direction opposite the tool axis (See FIG. 5C) until the half rings do not extend inside the circular groove 102 anymore. Actually, the sleeve 66 moves until the guiding pin 70 reaches an end position in the sloped groove 68. The end position correspond to the release position of the locking unit 32. The half rings 34*a*, 34*b* are at a non-zero distance from the circular groove and the head can be released or disengaged from the device 12. The released position of the locking unit 32 is not a stable position, as mentioned before. In other words, the user shall continue to apply an effort on the sleeve in order to maintain the half rings in the released position. Once the user release the effort on the sleeve, an automatic return of the sleeve and the locking unit and actuation unit in the locking position and the rest position is realized. The locking position is a stable position.

In another embodiment, the released and the locking positions could be stable positions. A hook or switch may be provided to maintain the sleeve in a position, in which the actuation unit is forced in the active position (and thus the locking unit is forced in the released position).

Figure 10:
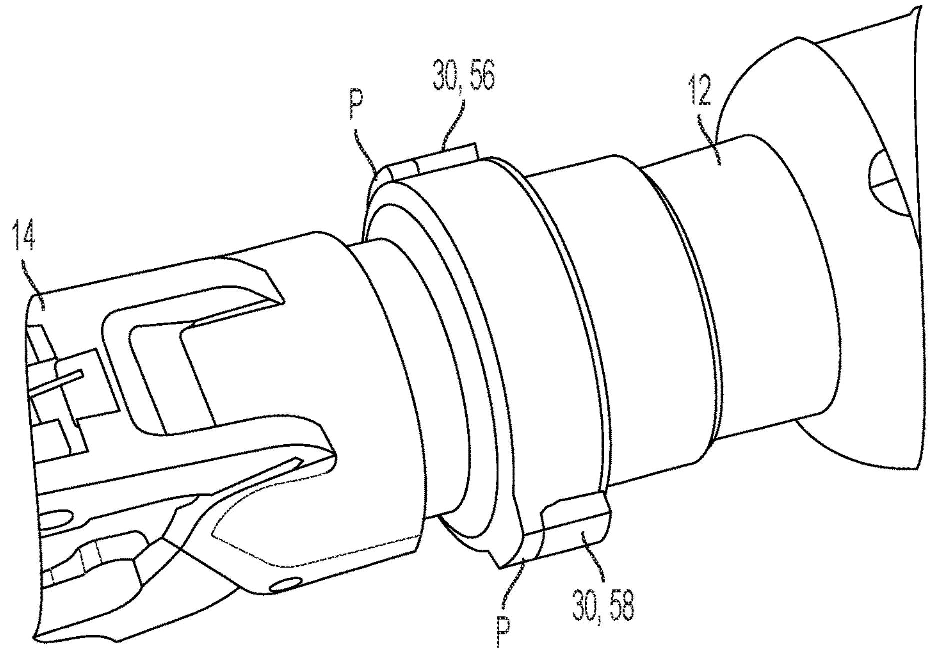
FIG. 10 shows a perspective view of a hydraulic tool with a device having a quick coupling system and an exchangeable head according to another embodiment.

FIG. 10 shows another embodiment of the device 10', whereas the actuation unit 30 is not actuated by a sleeve but can be directly actuated by a user. Indeed, the first actuation segment can protrude from the housing 62 and be directly actuated by the user when needed. A protrusion P may the designed directly in front of the first actuation part, such that a user will not press unintentionally the first actuation segment.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A power tool operable with an exchangeable tool head, the power tool comprising:

a tool body extending longitudinally along a tool axis to a free end;

a hydraulic cylinder, the hydraulic cylinder including a main piston movable inside the hydraulic cylinder under the effect of an injection of pressurised fluid into an interior of the cylinder;

a quick coupling system arranged at the free end of the tool body and comprising:

an actuation unit; and a locking unit movable by the actuation unit between a released position and a locked position to secure the exchangeable head to the tool body, and the locking unit comprises a first half-ring and a second half-ring radially movable between the released position and the locked position; and the quick coupling system further comprises a sleeve slidingly arranged around the quick coupling system, the sleeve movable along the tool axis;

the actuation unit is connected to the sleeve and adapted to be radially moved by the sleeve from a rest position to an active position; and when the actuation unit is in the rest position then the first half ring and the second half ring are in the locked position; and when the actuation unit is in the active position then the first half ring and the second half ring are forced in the released position; and wherein in the locked position the locking unit is adapted to secure the exchangeable head to the tool body, such that transmission forces can be exchanged between the exchangeable head and the main piston, and wherein in the released position the locking unit is adapted to release any force applied to the exchangeable head in order to remove the exchangeable head.

2. The power tool according to claim 1, and further comprising:

a first end portion and a second end portion on each of the first half-ring and the second half-ring, and each of the first end portion and the second end portion comprise a groove;

the actuation unit further comprises a first actuation part and a second actuation part, and both the first actuation part and the second actuation part each includes a first actuation segment and a second actuation segment; and each of the second actuation segments partly extend within the respective groove.

3. The power tool according to claim 2, wherein:

the second actuation segment of the first actuation part partly extends in the grooves of the first end portions of the first half ring and second half ring, and the second actuation segment of the second actuation part partly extends in the grooves of the second end portions of the first half ring and second half ring.

4. The power tool according to claim 1, wherein each of the first half ring and the second half ring has a curved shape with a front surface, a rear surface, two end portions, and two lateral portions extending between and perpendicular to the front surface and the rear surface, and:

the rear surface is flat;

the front surface comprises a first area extending parallel to the rear surface and a second area having a surface forming an angle with regard to the rear surface; and a shoulder is between the first and second areas, such that a first thickness of the first half ring and the second half ring between the rear surface and the first area is greater than a second thickness between the rear surface and the second area.

5. The power tool according to claim 1, wherein the sleeve comprises an internal surface facing the tool body and an external surface opposite the internal surface, and the internal surface comprises a slope which cooperates with the actuation unit, such that during movement of the sleeve, the actuation unit slides along the slope, resulting in the actuation unit moving radially toward the tool axis between the rest position and the active position.

6. The power tool according to claim 5, wherein the slope is a sloped groove and the actuation unit comprises a guiding pin inside the sloped groove.

7. The power tool according to claim 1, wherein the main piston is axially displaceable along a cylinder axis between a first position and a second position under the effect of an injection of the pressurised fluid into the interior of the cylinder, and wherein the main piston comprises a first end forming a piston surface, and a second end, opposite the first end, wherein the second end comprises a recess, in which an elastic element and a mushroom piston are arranged.

8. The power tool according to claim 1, and further comprising a pressure relief valve connected to the hydraulic cylinder.

9. An hydraulic tool for performing work on a workpiece, the hydraulic tool comprising:

a tool body extending longitudinally along a tool axis to a free end;

a hydraulic cylinder, the hydraulic cylinder including a main piston movable inside the hydraulic cylinder under the effect of an injection of pressurised fluid into an interior of the cylinder;

a quick coupling system arranged at the free end of the tool body and comprising:

an actuation unit; and a locking unit movable by the actuation unit between a released position and a locked position to secure the exchangeable head to the tool body, and the locking unit comprises a first half-ring and a second half-ring radially movable between the released position and the locked position; and an exchangeable tool head comprising:

a functional part adapted to apply a force to the workpiece; and an interface part for coupling with the tool body via the quick coupling system, and the interface part comprises:

a circular groove adapted to receive the locking unit;

a chamfer for facilitating the insertion of the head within the power tool; and a recess for partly receiving the main piston; and wherein the quick coupling system is removably connectable to the circular groove of the exchangeable head, such that when in the locked position of the locking unit, the exchangeable head is secured to the tool body with the half rings extending inside the circular groove, and in the released position, the exchangeable head can be removed from the tool body; and wherein in the locked position the locking unit is adapted to secure the exchangeable head to the tool body, such that transmission forces can be exchanged between the exchangeable head and the main piston, and wherein in the released position the locking unit is adapted to release any force applied to the exchangeable head in order to remove the exchangeable head.

10. The hydraulic tool according to claim 9, wherein, in the locked position of the locking unit, the first half ring and the second half ring cooperate with the circular groove, and an inclined surface of the circular groove cooperating with a slope provided on the half-rings and an edge of the circular ring cooperating with a shoulder of the half-rings.

11. A method for mounting an exchangeable tool head to a hydraulic tool in preparation for performing work on a workpiece, the method for mounting comprising the following steps:

providing a hydraulic tool comprising:

a tool body extending longitudinally along a tool axis to a free end;

a hydraulic cylinder, the hydraulic cylinder including a main piston movable inside the hydraulic cylinder under the effect of an injection of pressurised fluid into an interior of the cylinder;

a quick coupling system arranged at the free end of the tool body and comprising:

an actuation unit; and a locking unit movable by the actuation unit between a released position and a locked position to secure the exchangeable head to the tool body, and the locking unit comprises a first half-ring and a second half-ring radially movable between the released position and the locked position; and wherein in the locked position the locking unit is adapted to secure the exchangeable head to the tool body, such that transmission forces can be exchanged between the exchangeable head and the main piston;

wherein in the released position the locking unit is adapted to release any force applied to the exchangeable head in order to remove the exchangeable head;

wherein the locking unit starts in the locked position; and providing an exchangeable head comprising:

a functional part adapted to apply a force to the workpiece; and an interface part for coupling with the tool body via the quick coupling system, and the interface part comprises:

a circular groove adapted to receive the locking unit;

a chamfer for facilitating the insertion of the head within the power tool; and a recess for partly receiving the main piston;

inserting the exchangeable head within the tool body by pushing the exchangeable head along an insertion axis, such that a portion of the main piston enters the recess provided on the interface part and the chamfer contacts the locking unit;

moving the exchangeable head further along the insertion axis toward the tool body such that the chamfer pushes the locking unit from the locked position toward the released position, moving the exchangeable head still further along the insertion axis toward the tool body such that the locking unit faces the circular groove and the locking unit automatically returns to the locked position; and wherein the connection between the exchangeable head and the tool body requires a pushing force of at least 80 Newtons.

12. A power tool operable with an exchangeable tool head, the power tool comprising:

a tool body extending longitudinally along a tool axis to a free end;

a hydraulic cylinder, the hydraulic cylinder including a main piston movable inside the hydraulic cylinder under the effect of an injection of pressurised fluid into an interior of the cylinder;

a quick coupling system arranged at the free end of the tool body and comprising:

an actuation unit including a first actuation part and a second actuation part, and both the first actuation part and the second actuation part each includes a first actuation segment and a second actuation segment; and a locking unit movable by the actuation unit between a released position and a locked position to secure the exchangeable head to the tool body, and the locking unit includes:

a first half-ring and a second half-ring radially movable between the released position and the locked position, a first end portion and a second end portion on each of the first half-ring and the second half-ring, and each of the first end portion and the second end portion comprise a groove;

each of the second actuation segments partly extend within the respective groove: and wherein in the locked position the locking unit is adapted to secure the exchangeable head to the tool body, such that transmission forces can be exchanged between the exchangeable head and the main piston, and wherein in the released position the locking unit is adapted to release any force applied to the exchangeable head in order to remove the exchangeable head.

13. The power tool according to claim 12, wherein:

the second actuation segment of the first actuation part partly extends in the grooves of the first end portions of the first half ring and second half ring, and the second actuation segment of the second actuation part partly extends in the grooves of the second end portions of the first half ring and second half ring.

14. The power tool according to claim 12, wherein each of the first half ring and the second half ring has a curved shape with a front surface, a rear surface, two end portions, and two lateral portions extending between and perpendicular to the front surface and the rear surface, and:

the rear surface is flat;

the front surface comprises a first area extending parallel to the rear surface and a second area having a surface forming an angle with regard to the rear surface; and a shoulder is between the first and second areas, such that a first thickness of the first half ring and the second half ring between the rear surface and the first area is greater than a second thickness between the rear surface and the second area.

15. The power tool according claim 12, wherein the quick coupling system further comprises a sleeve slidingly arranged around the quick coupling system, the sleeve movable along the tool axis;

the actuation unit is connected to the sleeve and adapted to be radially moved by the sleeve from a rest position to an active position; and when the actuation unit is in the rest position then the first half ring and the second half ring are in the locked position; and when the actuation unit is in the active position then the first half ring and the second half ring are forced in the released position.

16. The power tool according to claim 15, wherein the sleeve comprises an internal surface facing the tool body and an external surface opposite the internal surface, and the internal surface comprises a slope which cooperates with the actuation unit, such that during movement of the sleeve, the actuation unit slides along the slope, resulting in the actuation unit moving radially toward the tool axis between the rest position and the active position.

17. The power tool according to claim 16, wherein the slope is a sloped groove and the actuation unit comprises a guiding pin inside the sloped groove.

18. An hydraulic tool for performing work on a workpiece, the hydraulic tool comprising:

a tool body extending longitudinally along a tool axis to a free end;

a hydraulic cylinder, the hydraulic cylinder including a main piston movable inside the hydraulic cylinder under the effect of an injection of pressurised fluid into an interior of the cylinder;

a quick coupling system arranged at the free end of the tool body and comprising:
an actuation unit; and
a locking unit movable by the actuation unit between a released position and a locked position to secure the exchangeable head to the tool body, and the locking unit comprises a first half-ring and a second half-ring radially movable between the released position and the locked position; and
an exchangeable tool head comprising:
a functional part adapted to apply a force to the work-piece; and
an interface part for coupling with the tool body via the quick coupling system, and the interface part comprises:
a circular groove adapted to receive the locking unit;
a chamfer for facilitating the insertion of the head within the power tool; and
a recess for partly receiving the main piston; and
wherein the quick coupling system is removably connectable to the circular groove of the exchangeable head, such that when in the locked position of the locking unit, the exchangeable head is secured to the tool body with the half rings extending inside the circular groove, and in the released position, the exchangeable head can be removed from the tool body; and
the quick coupling system further comprises a sleeve slidingly arranged around the quick coupling system, the sleeve movable along the tool axis;
the actuation unit is connected to the sleeve and adapted to be radially moved by the sleeve from a rest position to an active position; and
when the actuation unit is in the rest position then the first half ring and the second half ring are in the locked position; and when the actuation unit is in the active position then the first half ring and the second half ring are forced in the released position; and
wherein in the locked position the locking unit is adapted to secure the exchangeable head to the tool body, such that transmission forces can be exchanged between the exchangeable head and the main piston, and
wherein in the released position the locking unit is adapted to release any force applied to the exchangeable head in order to remove the exchangeable head.

19. The hydraulic tool according to claim 18, wherein, in the locked position of the locking unit, the first half ring and the second half ring cooperate with the circular groove, and an inclined surface of the circular groove cooperating with a slope provided on the half-rings and an edge of the circular ring cooperating with a shoulder of the half-rings.

* * * * *